BENJAMIN F. ALLEN
LEE C. FRIDD
INVENTORS

BY Frank C. Parker

ATTORNEY

Aug. 27, 1968   B. F. ALLEN ET AL   3,398,828
HOLDING DEVICE FOR CYLINDRICAL OBJECTS
Filed Sept. 20, 1967   3 Sheets-Sheet 2

INVENTORS
BENJAMIN F. ALLEN
LEE C. FRIDD
BY
Frank C. Parker
ATTORNEY

BENJAMIN F. ALLEN
LEE C. FRIDD
INVENTORS

United States Patent Office 3,398,828
Patented Aug. 27, 1968

3,398,828
HOLDING DEVICE FOR CYLINDRICAL OBJECTS
Benjamin F. Allen, West Brighton, and Lee C. Fridd, Rochester, N.Y., assignors to Bausch & Lomb Incorporated, Rochester, N.Y., a corporation of New York
Filed Sept. 20, 1967, Ser. No. 669,213
5 Claims. (Cl. 206—72)

ABSTRACT OF THE DISCLOSURE

A holding device of the type designed to retain a plurality of cylindrical objects of varying thicknesses and of varying diameters is provided herein and comprises an outer framework with a plurality of divider members attached interiorly of the framework. Each divider member contains a plurality of elongated grooves formed on the side thereof, said grooves pointing downwardly and being inclined outwardly from the top of the divider to the bottom of the divider.

Cross-references to related applications

None.

Background of the invention

This invention relates generally to a holding device and more specifically relates to a new and novel holding device designed to retain a plurality of cylindrical objects of varying diameter and varying thickness within the holding device.

Holding devices as constructed under the prior art are typified by the patent to E. U. Kinsey, No. 593,024, issued Nov. 2, 1897. Devices of this type utilize a plurality of divider members containing V-shaped grooves on the side thereof to retain the cylindrical objects desirous of being held. A common modification of this type of device would have the divider members fixedly attached to the side framework of the holding device in place of the movable attachment as shown in FIGURE 1 of the cited patent.

Another common variation of holding devices such as this would be to employ rectangular grooves in the divider member in place of the V-shaped grooves as shown again in FIGURE 1 of the cited patent.

When utilizing holding devices as construed under the prior art to retain a plurality of optical lenses, many troubles were encountered. One problem often encountered was that of the divider member warping, said warping being caused by any number of factors. The warpage of the divider member would in turn result in the lenses either not fitting into the tray or the lenses falling out of the holder depending upon the direction of the warpage.

Another problem inherent in the design of prior art holders was that of inflexibility in that each holder was specifically designed to retain only a plurality of lenses of either the same diameter or of all having the same thickness. Such inflexibility required the lens manufacturer to stock a multitude of holding devices to handle the multitude of lenses of varying diameters and of varying thicknesses.

Summary of the invention

In order to overcome the problems inherent with holding devices of the type hereinbefore mentioned, we have devised a new and novel type of holding device wherein a plurality of cylindrical objects of varying diameter and of varying thickness may be retained. In addition, the plurality of objects may be of mixed diameters and thicknesses within limits of the given dimensions of our holding device.

The holding device of our invention comprises a plurality of divider members, fixedly attached to the interior of an outer framework. The divider members contain a plurality of elongated grooves on the exterior sides thereof, with each groove facing in a downwardly manner and at the same time being inclined outwardly from the top of the divider member to the bottom thereof. By using an inclined groove on the divider member, a tapered pocket is formed, said taper thereby serving as the means whereby a plurality of cylindrical objects of varying diameter may be retained by our holding device.

Accordingly, it is an object of this invention to provide a new and novel holding device of the type wherein a plurality of intermixed cylindrical objects may be retained in the same device without necessitating separate holding devices for each size of object.

Another object is to provide a new and novel holding device of the type providing an automatic adjustment to retain the plurality of cylindrical objects held therein, said objects being of different diameters and of different thicknesses.

Yet another object of our invention is to provide a new and novel holding device of the type that will retain a plurality of cylindrical objects in a fixed position regardless of the amount of warpage that may occur in the divider members of the holding device.

These and other objects and advantages of our invention will become apparent from the following description when taken in conjunction with the accompanying drawing.

Description of the preferred embodiment

Figure 1:
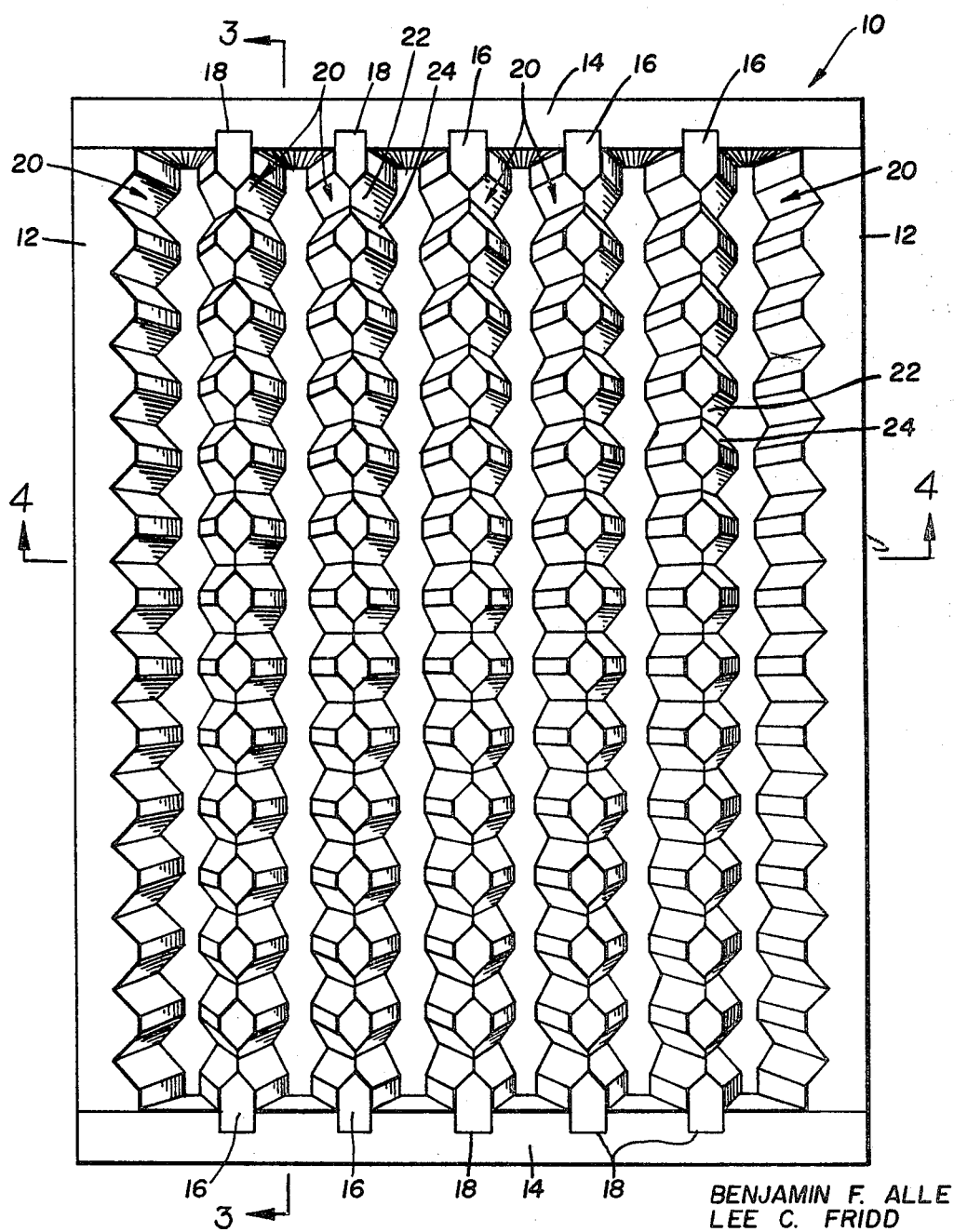
FIGURE 1 is a top general perspective view of the holding device of our invention.

The holding device of our invention is shown generally as the numeral 10 in FIGURE 1 and comprises an outer box-like frame comprising a pair of side members 12 along with a pair of end members 14, said side and end members being rigidly fastened together by means well known in the art.

Interspaced between the pair of side members 12 are a plurality of divider members 16 of the size and configuration as will be hereinafter described. The divider members 16 are fixedly attached to the end members 14 by means of a slot 18 formed on the inner sides of the end members 14. The slots 18 may take the shape of the divider members 16 or may be constructed of different shapes since the slots 18 serve only as one means of retaining the plurality of divider members 16 on the end members 14.

Formed on the sides of the divider members 16 are a plurality of elongated grooves 20, said grooves being generally V-shaped and being inclined downwardly. In the configuration shown in FIGURE 1 the elongated grooves 20 are formed as a pair of matching sides 22 and 24, the sides 22 and 24 forming a substantially 90° angle with each other.

Figure 4:
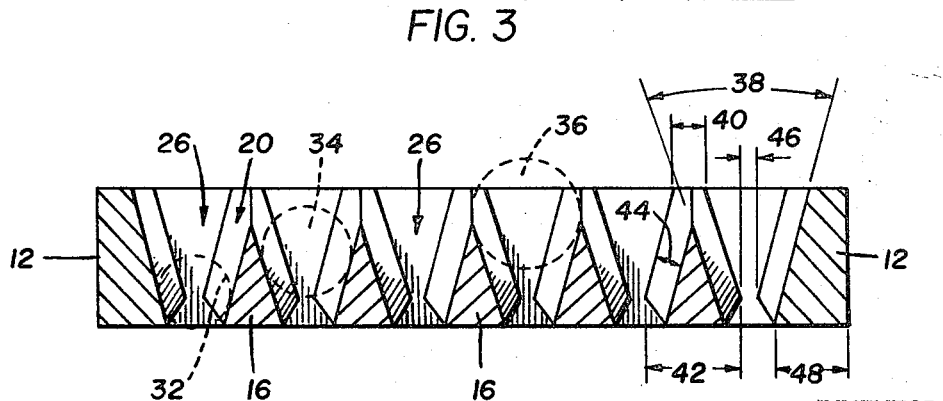
FIGURE 4 is a cross-sectiinal view of our device taken along line 4—4 of FIGURE 1

The plurality of elongated grooves 20 on the divider members 16 are in addition to being inclined downwardly are also inclined outwardly from the top of the divider member 16 to the bottom thereof. This is best shown by referring to FIGURE 4 which is a cross-sectional view of our device taken along line 4—4 of FIGURE 1. By inclining the elongated groove 20 outwardly from the top of the divider member 16 to the bottom thereof, as shown in FIGURE 4, there is formed a pocket 26 which acts as the means whereby a plurality of cylindrical objects of varying diameters may be retained.

Returning now to FIGURE 1 and completing the basic form of the invention, there is formed on the side members 12 of our holding device a plurality of elongated grooves 20 of the same general V-shape and inclined in a manner similar to the grooves formed on the divider members 16.

Figure 2:
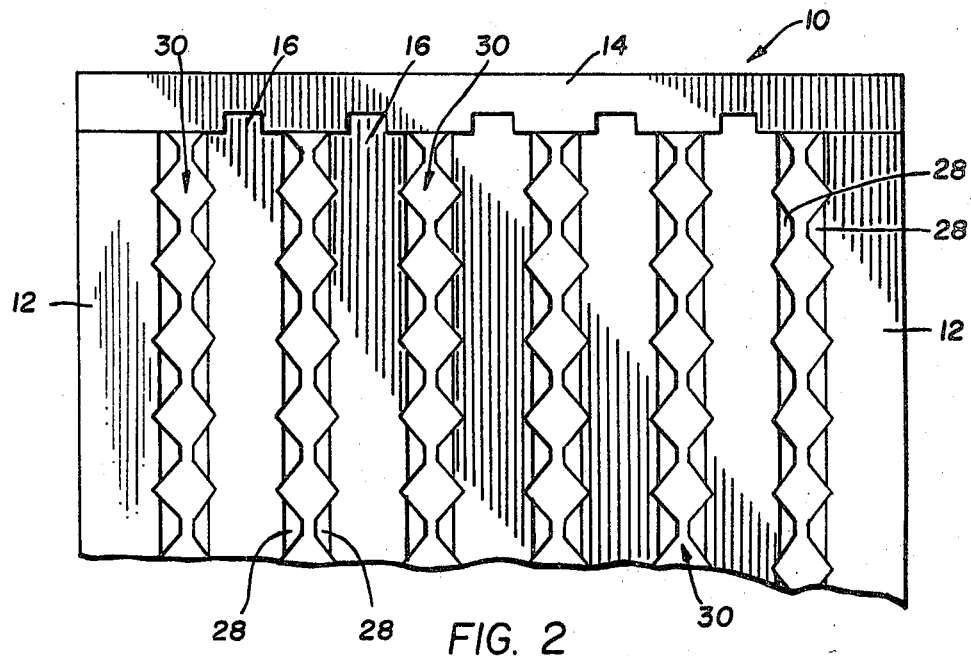
FIGURE 2 is bottom general perspective view of the same device.

Turning now to FIGURE 2, there is shown a bottom general perspective view of the holding device of our invention showing the outer frame comprising the pair of side members 12, the end members 14 along with the plurality of divider members 16.

The divider member 16 in the configuration shown in FIGURE 1 and FIGURE 2 are formed in the general shape of a truncated triangular prism having beveled edges 28 formed on the base of the truncated triangular prism. By the use of the beveled edges 28 on the base of the divider members 16 as well as on the base of the side members 12, there is formed an elongated trough 30 on the bottom of the holding device 10, said trough being utilized in a manner as hereinafter described.

Figure 3:
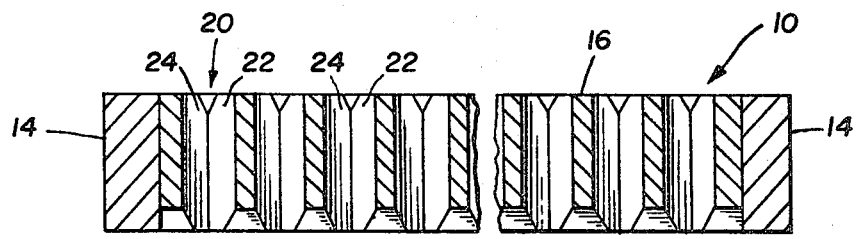
FIGURE 3 is a cross-sectional view of our holding device taken along line 3—3 of FIGURE 1.

Referring now to FIGURE 3 of the drawings, there is shown a cross-sectional view of our device taken along line 3—3 of FIGURE 1. The V-shaped elongated groove 20 comprising the pair of sides 22 and 24 is shown in their downwardly inclined manner originating at the top of the divider member 16 and terminating at the bottom thereof.

The material from which the end members 14, the side members 12 and the divider members 16 is constructed depends upon the partciular usage to which the holding device is put. It has been found in practice that whenever the holding device 10 is utilized as a lens tray for washing the lenses, a wood material is preferable with the wood cypress being utilized almost universally. Should the holding device 10 be utilized as a shipping container for shipping the optical lenses then a plastic construction may be preferred, said plastic being of any type that would possess sufficient rigidity to retain the lenses in the holding device and yet be light enough to be economically usable.

Referring now particularly to FIGURE 4 of the drawings, there is shown a cross-sectional view of our invention taken along line 4—4 of FIGURE 1. The divider members 16 as a result of the downwardly inclined elongated grooves 20 formed thereon form a plurality of pockets 26, said pockets serving to retain the plurality of cylindrical objects of varying diameters as heretofore mentioned. Should the cylindrical object be small in diameter, as shown by the dotted object 32, the object will be retained in the pocket 26 in the bottom thereof. Whenever the cylindrical object is of a somewat larger size as shown by the cylindrical object 34, the inclined elongated groove 20 will retain the object 34 in a mid position in the holding device 10. Finally, the cylindrical object may take the size shown as the dotted object 36 in FIGURE 4 in which case the inclined elongated groove 20 will retain the cylindrical object 36 in an upper position in the holding device 10.

From the above, it becomes apparent that a plurality of cylindrical shaped objects 32, 34, or 36 may be held by the holding device 10 in a random or mixed manner as shown in FIGURE 4. In addition, the plurality of cylindrical objects held by the holding device 10 may also be all of the same diameter.

From this, it becomes apparent that by the use of an elongated inclined groove 20 used in the manner hereinbefore described there is formed a pocket 26, which pocket allows a plurality of varying diameter, cylindrical objects to be retained therein. In addition, it becomes apparent that due to the elongated groove having a generally V-shape comprising the sides 22 and the sides 24, the cylindrical shaped objects 32, 34 and 36 may have varying edge thicknesses and still may be retained equally effective by the elongated grooves 20.

In adapting our holding device to the particular form of a lens holder, we have by varying the internal dimensions of our holding device, provided a plurality of lens holders which will retain a majority of the lenses encountered in a given situation. Referring to FIGURE 4, for example, we have found that by holding the pocket angle, shown as numeral 38, constant at 30° and by varying the dimensions shown by the numerals 40–48 in FIGURE 4, throughout the ranges given in the following Table I, we are able to accommodate with six lens holders, numbered 1–6 a plurality of lenses having the diameters and edge thicknesses as shown in the following Table II.

TABLE I

| Dimension: | Distance (inches) |
| --- | --- |
| 40 | ¼ to ½ |
| 42 | 1⅛ to 1¾ |
| 44 | ³⁄₁₆ to ⅜ |
| 46 | ⅛ to 1½ |
| 48 | 1¹¹⁄₁₆ to 1½ |

TABLE II

| Lens holder | Lens φ having sharp edge (mm.) | Lens φ having edge thicknesses (mm.) | Maximum edge thicknesses (mm.) |
| --- | --- | --- | --- |
| #1 | 13–28 | 4.0–22.5 | 7 |
| #2 | 27–36 | 10.3–23.0 | 15 |
| #3 | 36–42 | 20.5–32.5 | 15 |
| #4 | 42–56 | 24.0–43.5 | 15. |
| #5 | 55–63 | 35.0–51.0 | 15 |
| #6 | 63–69 | 44.0–57.0 | 15 |

By the use of our holding device in the manner just described, we are able to provide with the minimum number of lens holders (for example 6) flexibility to the extent that we are able to accommodate a plurality of lenses ranging in diameter from 13 mm. to 69 mm. or a plurality of lenses having edge thicknesses ranging from 0 mm. to 15 mm.

In designing flexibility such as this into a plurality of lens holders utilizing our concept, the pockets 26 are sized by varying the dimensions 40–48 in such a manner as to allow for a complete overlapping of one lens holder with the next lens holder. For example, the largest size lens that a given tray will retain may also be retained by the next larger size tray although being held at the bottom of the pocket 26.

Figure 5:
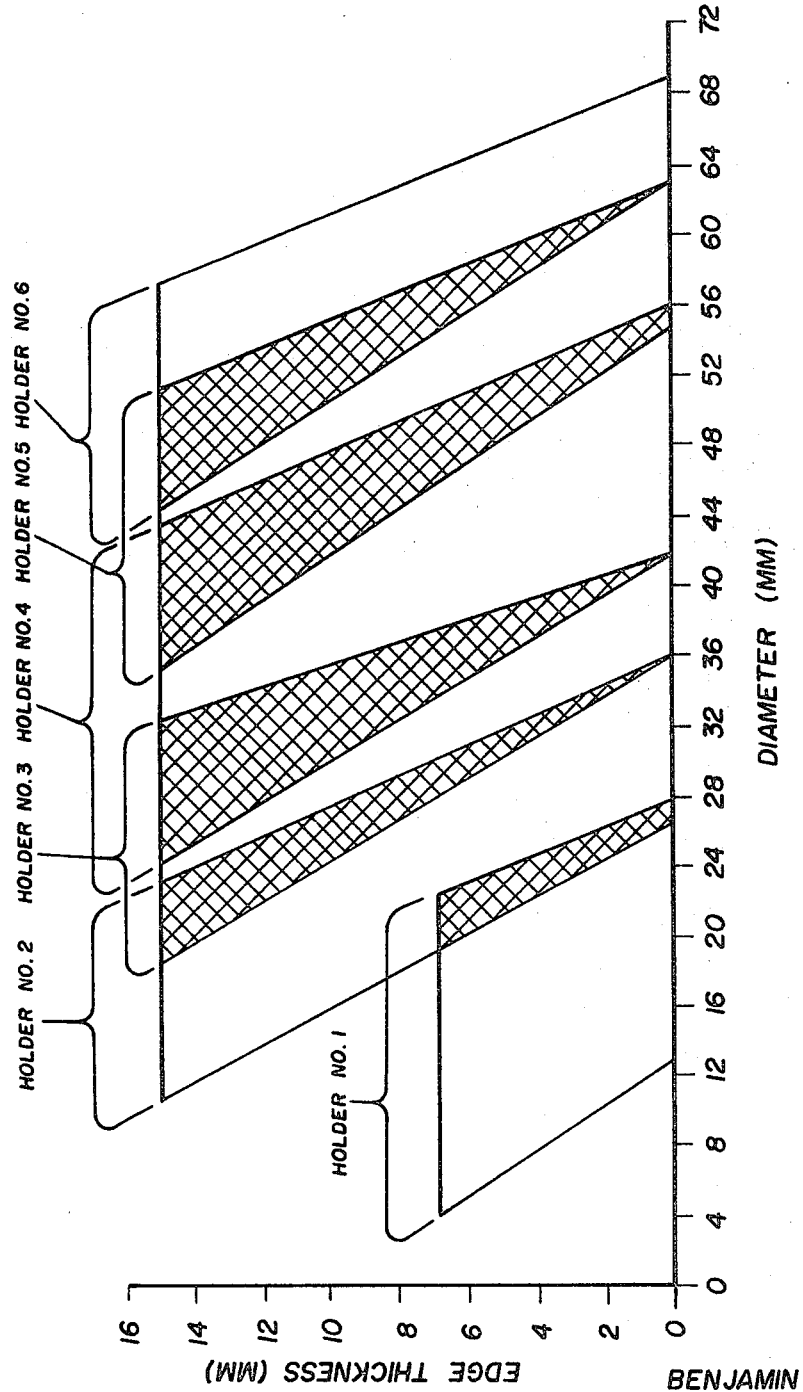
FIGURE 5 is a graph which illustrates how our device may be designed to provide greater flexibility when used as a lens holder, which will be explained in detail hereinafter in the specification.

The following is graphically illustrated by referring to FIGURE 5, wherein there is shown a graph plotting lens diameter in millimeters versus edge thickness in millimeters. The study of the graph will reveal that the largest size of lenses capable of being held by a holder 1 may also be held by holder 2 as shown by the shaded area of the graph.

Similarly, the largest size lens that is capable of being held by holder 2 may also be held by holder 3 as shown by the shaded area of the graph overlapping these two holders. From this, it will be seen that by varying the design parameters of our basic structure we are able to achieve a flexibility heretofore unknown in lens holders shown in the drawings.

In utilizing the holding device 10 of our invention, a plurality of cylindrical objects 32, 34 or 36, having the same or varying thickness are simply placed in the plurality of pockets 26 formed by the plurality of elongated grooves 20 as hereinafter described. Since the elongated grooves 20 are inclined outwardly from the top of the divider member 16 to the bottom thereof, it can be seen that wrapage of the divider member 16 will have little effect on the capabilities of the holding device 10 to retain the plurality of cylindrical objects. Should the divider member 16 be warped or slightly out of its correct alignment position, a cylindrical object such as lens placed in the pocket 26 will simply be carried higher or lower in the pocket depending upon the direction of the warpage or misalignment of the divider member 16.

Returing to FIGURE 2, by providing the beveled ends 28 on the bottom of the truncated triangular prism divider member 16, there are formed a plurality of elongated troughs 30 on the bottom of the holding device 10. These troughs 30 may be utilized to retain any number of a variety of elongated optical members such as trianguler-shaped prisms or the like. By incorporating the elongated trough 30 into our holding device 10, we have provided still more flexibility in that the basic holding device 10 may be used not only as a device to retain a plurality of cylindrical-shaped objects as hereinbefore described but may also be utilized, by simply turning the holding device over, to retain other shaped members in the elongated trough 30.

From the foregoing, it will be seen that we have provided efficient and economical means to accomplish all of the objects and advantages of our invention. Nevertheless, it is apparent that many changes in the details of construction and arrangement of parts may be made but not departing from the spirit and scope of the invention as expressed in the accompanying claims and the invention is not to be limited to the exact matters shown and described as only the preferred embodiments have been given by way of illustration.

We claim:

1. In a holding device of the type designed to retain a plurality of cylindrical-shaped objects of varying diameter and of varying thickness, the combination comprising;
   (a) an outer frame,
   (b) a plurality of divider members fixedly attached interiorly to said outer frame,
   (c) means forming a plurality of elongated grooves on the exterior sides of said divider members in a downwardly manner, said grooves also being inclined outwardly from the top of the divider member to the bottom of said divider member thereby forming a plurality of pockets, said pockets serving as the means of retaining the plurality of cylindrical-shaped objects.

2. The combination as defined in claim 1 and further characterized by said divider members being formed in the shape of a truncated triangular prism with said elongated grooves being formed on two of the exterior sides thereof.

3. The combination as defined by claim 2 and further characterized by said elongated grooves being formed in a V-shape originating at the truncated upper part of said prism and terminating at the base thereof.

4. The combination as defined by claim 3 and further characterized by said outer frame comprising a pair of side members fixedly attached to a pair of end members thereby forming said outer frame, the pair of side members having a plurality of elongated grooves formed thereon similar to the elongated grooves formed on the divider members, with the pair of end members having said plurality of divider members fixedly attached thereto.

5. The combination as defined by claim 4 and further characterized by said truncated triangular prism containing beveled edges at the bottom thereof, said beveled edges forming an elongated trough at the bottom of the holding device whereby a plurality of objects may be retained by said trough.

References Cited

UNITED STATES PATENTS

| | | | |
|---|---|---|---|
| 368,720 | 8/1887 | Johnston | 206—72 |
| 593,024 | 11/1897 | Kinsey | 206—72 |

JAMES B. MARBERT, *Primary Examiner.*

UNITED STATES PATENT OFFICE
CERTIFICATE OF CORRECTION

Patent No. 3,398,828                      August 27, 1968

Benjamin F. Allen et al.

It is certified that error appears in the above identified patent and that said Letters Patent are hereby corrected as shown below:

Column 1, line 44, "construed" should read -- constructed --. Column 3, line 41, after "universally." insert -- Should the lens tray be used in a degreasing operation a rigid plastic is preferred. --.

Signed and sealed this 10th day of March 1970.

(SEAL)
Attest:

Edward M. Fletcher, Jr.

Attesting Officer

WILLIAM E. SCHUYLER, JR.

Commissioner of Patents